United States Patent [19]
Erlichman

[11] 3,906,527
[45] Sept. 16, 1975

[54] SHAFT DRIVE AND CONTROL SYSTEM FOR AUTOMATIC CAMERA

[75] Inventor: Irving Erlichman, Wayland, Mass.

[73] Assignee: Polaroid Corporation, Cambridge, Mass.

[22] Filed: July 1, 1974

[21] Appl. No.: 484,408

[52] U.S. Cl. .............................. 354/152; 354/85
[51] Int. Cl.² ...................................... G03B 19/12
[58] Field of Search .......... 354/152, 153, 158, 173, 354/83, 85, 86

[56] References Cited
UNITED STATES PATENTS

| | | | |
|---|---|---|---|
| 3,714,879 | 2/1973 | Land | 354/158 X |
| 3,771,427 | 11/1973 | Blinow | 354/158 |

Primary Examiner—Monroe H. Hayes
Attorney, Agent, or Firm—John W. Ericson

[57] ABSTRACT

A shaft drive and control system for an automatic camera having a plurality of shaft driven devices operable in a photographic cycle at different times and at different speeds, in which the camera has a film pack receiving well, and comprising an electric motor mounted in one end of the camera at one end of the well and coupled to a harmonic drive unit that effects a shaft speed reduction to the highest speed required for camera operation. A first shaft drive system including an elongated timing belt extends down the side of the camera from the output shaft of the harmonic drive unit to processing rolls mounted in the front of the camera to drive the processing rolls. The output shaft of the harmonic drive unit drives a second shaft through a reduction gear at an intermittent speed. The second shaft controls a mechanism that acts at times to drive a film unit out of the film pack in the well into engagement with the processing rolls. The second shaft drives a third shaft through a second reduction gear. The third shaft drives a cam that serves at times to recock the reflex mirror in the camera.

5 Claims, 8 Drawing Figures

SHAFT DRIVE AND CONTROL SYSTEM FOR AUTOMATIC CAMERA

This invention relates to photography, and particularly to a novel shaft control system for automatic cameras.

A highly automated and sophisticated camera has been developed and marketed as the Polaroid Land SX-70 reflex camera, manufactured and sold by Polaroid Corporation of Cambridge, Mass. A particular embodiment of this camera is shown and described, for example, in U.S. Pat. No. 3,714,879, issued on Feb. 6, 1973 to Edwin H. Land, Igor Blinow and Vaito K. Eloranta for REFLEX CAMERA, and assigned to the assignee of this application. As there more fully shown and described, the camera is a fully automatic single lens reflex that is foldable into a thin compact shape. When erected, and supplied with a cassette including film units and a battery, the camera responds to the touch of a button to produce a photograph that is immediately driven out of the camera, and there proceeds to complete its development.

In the process of making an exposure in a camera of the kind described, the shutter is closed and a reflex mirror system is moved from a viewing position to an exposure position. The shutter is then opened, and a photoelectrically determined exposure is made on the outermost film unit in the cassette. The shutter is then closed, and a pick is actuated to advance the exposed film unit into engagement with a pair of processing rolls mounted at the front of the camera. The film unit is driven through the processing rolls under pressure to distribute a supply of film processing composition throughout a photosensitive laminar system in the film unit. The reflex mirror system is then returned to its viewing position, and the shutter is opened.

This summary of the operation of the camera described in the above-cited patent only suggests the complexity of the operating program that is carried out during an exposure cycle, and of the apparatus required to carry out the program when implemented in a form capable of enclosure in the desirably compact confines of the camera when it is in its folded position. In order to attain this desirable compactness of construction, a unique, essentially U-shaped, dual power train was devised. As fully illustrated in the above-cited patent, this power train extends about three sides of the well that receives the film pack, and includes an electric motor at the back of the well. The motor drives a thin, elongated dual gear train extending down the sides of the well. The gear train is connected to a pair of processing rolls that extend across the front of the camera in position to receive a film unit advanced from the film pack in the well.

This dual gear train performs a number of functions, including the transmission of power from the motor at the back of the camera to the processing rolls at the front; shaft speed control functions which reduce the initially high speed of the motor output shaft to various shaft speeds required for operation of the elements of the camera, particularly the pick control mechanism and a mirror recocking cam; and the maintenance of the necessary synchronism between several of the parts.

The dual gear train devised for this purpose, and shown in the above-cited patent, is compact and reliable in operation. However, because there are a relatively large number of gear meshes in each branch of the power train, the overall efficiency of the system leaves something to be desired. In particular, in the path from the motor shaft to the pick drive mechanism there are four gear meshes; in the path to the mirror recocking cam, there are six; and in the path to the processing rolls, there are eight. Assuming an efficiency of 95 percent per mesh, the maximum efficiencies with which these components are driven are 81.5 percent for the pick, 73.6 percent for the cam, and 66.5 percent for the processing rolls.

It has been found that by far the most power is consumed by the processing rolls. Accordingly, a substantial improvement in the efficiency with which these rolls are driven would effect a significant and highly desirable improvement in the efficiency of the system. It is a principal object of this invention to improve the efficiency of plural speed drive systems of the kind described. Other objects of the invention are to simplify the construction and facilitate the manufacture of a power train of the general configuration shown in the above-cited patent, while retaining the functional capabilities of that system.

Briefly, the above and other objects of the invention are attained by the construction of a novel branched drive train in which an electric motor drives a primary shaft through a strain wave shaft speed reduction unit at a speed equal to, or at least near, the speed at which the processing rolls are to be driven. This primary shaft, located at the rear of the camera, is coupled to the processing rolls by an elongated drive system including a flexible belt extending along the side of the camera to the processing rolls, which extend across the front of the camera. The primary shaft also drives a secondary shaft, through a reduction gear, and the secondary shaft drives a tertiary shaft, through another reduction gear. The secondary shaft makes four revolutions for each revolution of the tertiary shaft, and each revolution of the tertiary shaft corresponds to one exposure and processing cycle of camera operation. The secondary shaft drives the pick mechanism, and the tertiary shaft drives the mirror recocking cam. It has been found that by this arrangement, a considerable improvement in efficiency can be attained in driving all of the energy consuming devices, including most significantly the processing rolls. At the same time, a substantial reduction in the number of parts required is effected, with a concomitant simplification of the process of manufacture and assembly of the drive train.

The manner in which the apparatus of the invention is constructed, and its mode of operation, will best be understood in the light of the following detailed description, together with the accompanying drawings, of a preferred embodiment thereof.

Figure 1:
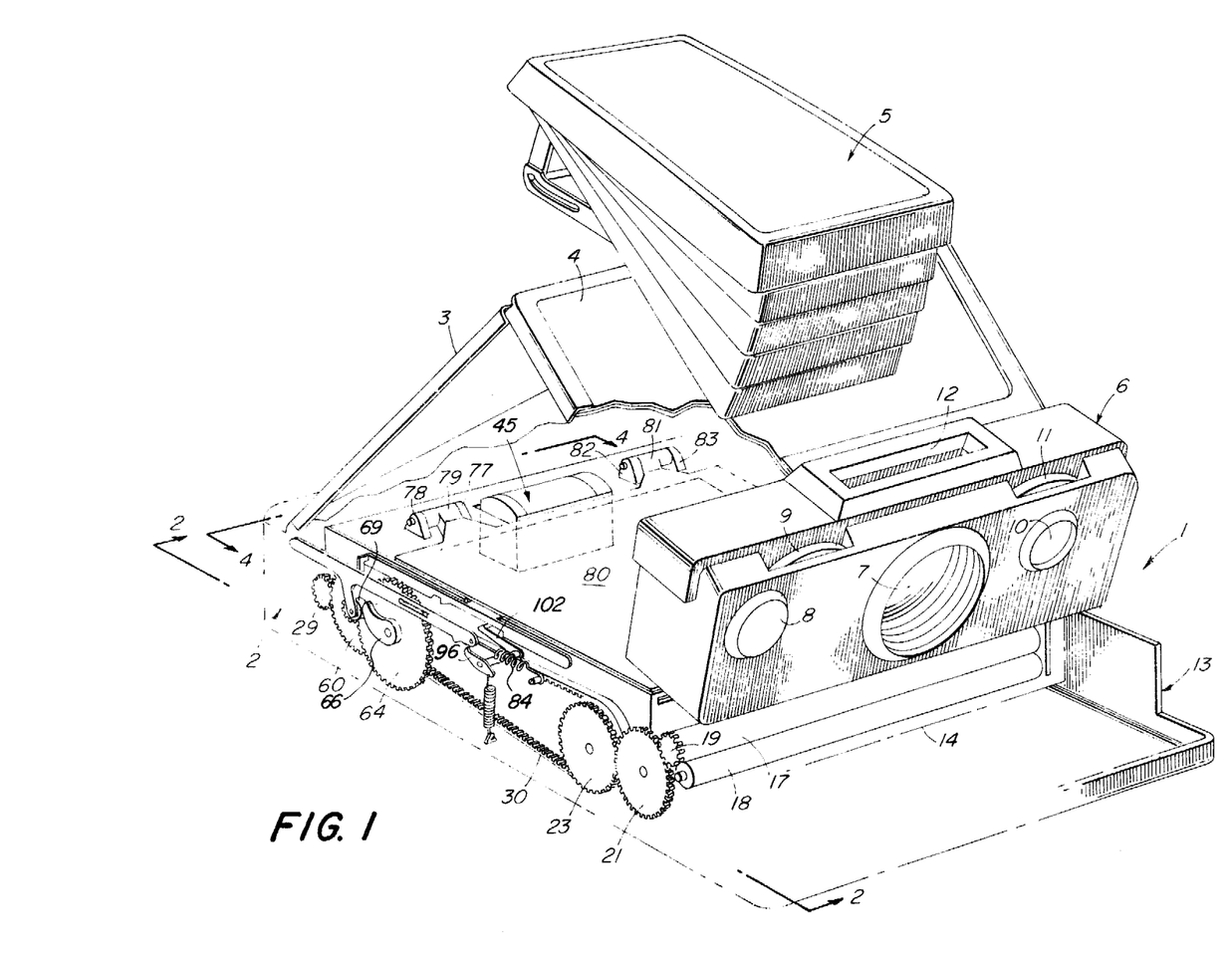
FIG. 1 is a schematic, fragmentary perspective sketch of a camera incorporating the shaft drive and control system of the invention.

Referring now to FIG. 1, there is shown an automatic reflex camera 1 that may be identical to the commercially available Polaroid Land SX-70 camera, or to the particulr version thereof shown specifically in the above-cited U.S. Pat. No. 3,714,879, except for the modifications to be described herein. Generally speaking, the camera comprises a main housing suggested at 2 hinged to a rear top panel 3 and a front top panel 4 on which a collapsible viewfinder 5 is mounted. The camera is shown in the erect position in which it is extended for use.

A lens board and shutter housing 6 hinged to the main housing 2 carries a taking lens 7, a shutter button 8, a focusing knob 9, a photocell window 10, an exposure trim control knob 11 and an accessory receptacle 12. The receptacle 12 is adapted to receive a flash bar, for example.

A forward bed portion 13 of the camera is hinged to the main housing 2 in any conventional manner, so that the bed portion 13 can swing down around the axis suggested at 14 to facilitate loading of the camera. For this purpose, referring to FIG. 2, the bed portion 13 comprises side frame members 15 that are hinged to the main housing 2 as suggested at 16.

Figure 2:
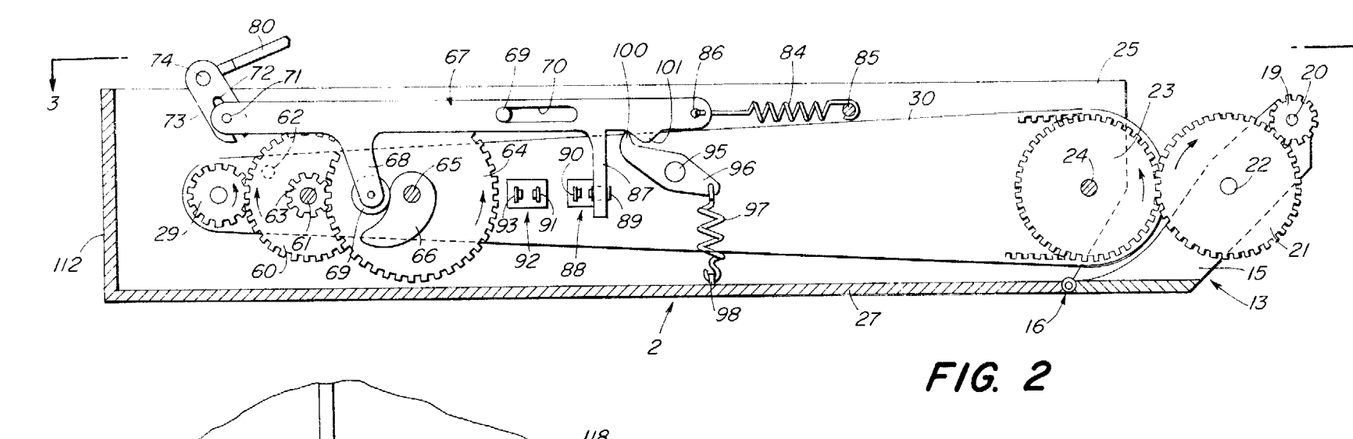
FIG. 2 is a schematic and fragmentary elevational view of the camera of FIG. 1, with parts shown in cross-section, parts omitted and parts broken away, taken substantially along the lines 2—2 in FIG. 1.

Referring to FIGS. 1 and 2, the bed 13 carries a pair of processing rolls 17 and 18 that are journalled in the frame members 15 for counterrotation when the roll 17 is driven by rotation of a pinion 19 carried on an axle 20 on which the roll 17 is mounted. The pinion 19 is arranged to be driven by a gear 21 journalled on a shaft 22 fixed to the bed 13.

Figure 4:
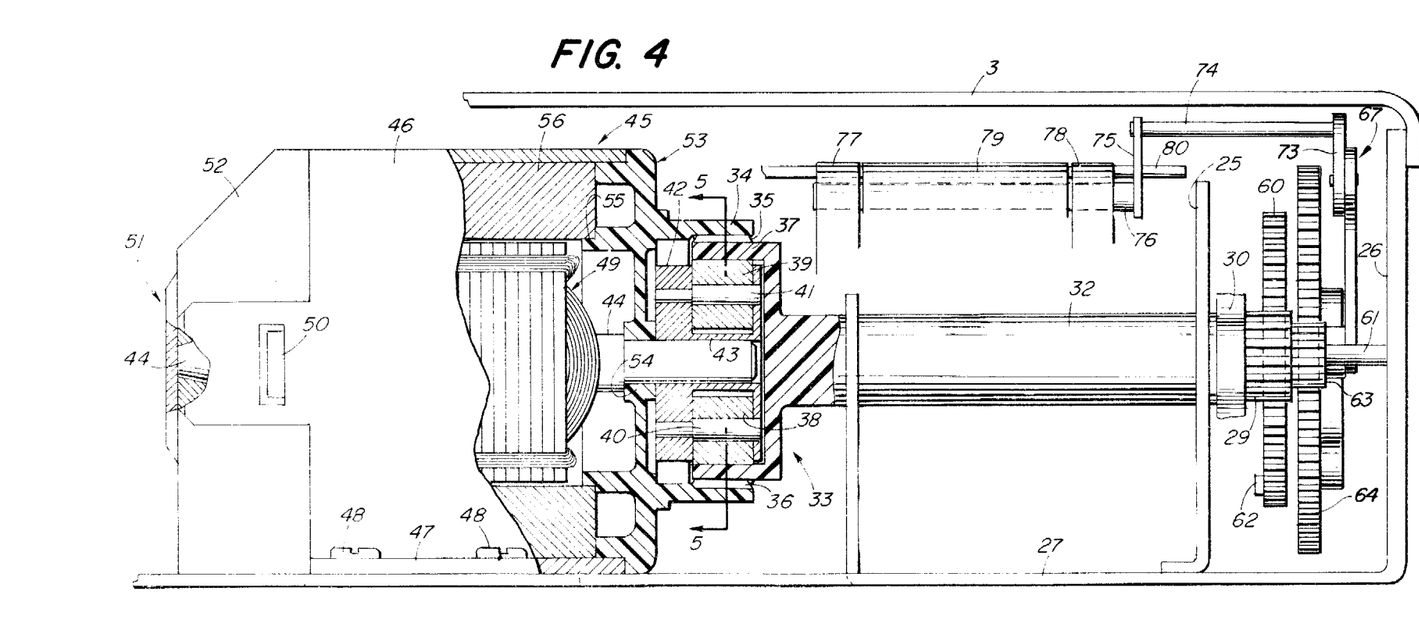
FIG. 4 is a schematic and fragmentary end view of a portion of the apparatus of FIG. 1, on an enlarged scale, with parts shown in cross-section, parts omitted and parts broken away, taken substantially along the lines 4—4 in FIG. 1.

In the position of the bed 13 shown, the gear 21 is in mesh with a gear 23. The gear 23 is rotatably mounted on a shaft 24. The shaft 24 is fixed between a pair of side plates 25 and 26. As shown in FIG. 4, the plate 25 may be affixed to, and the plate 26 formed integral with, a base plate 27.

Figure 3:
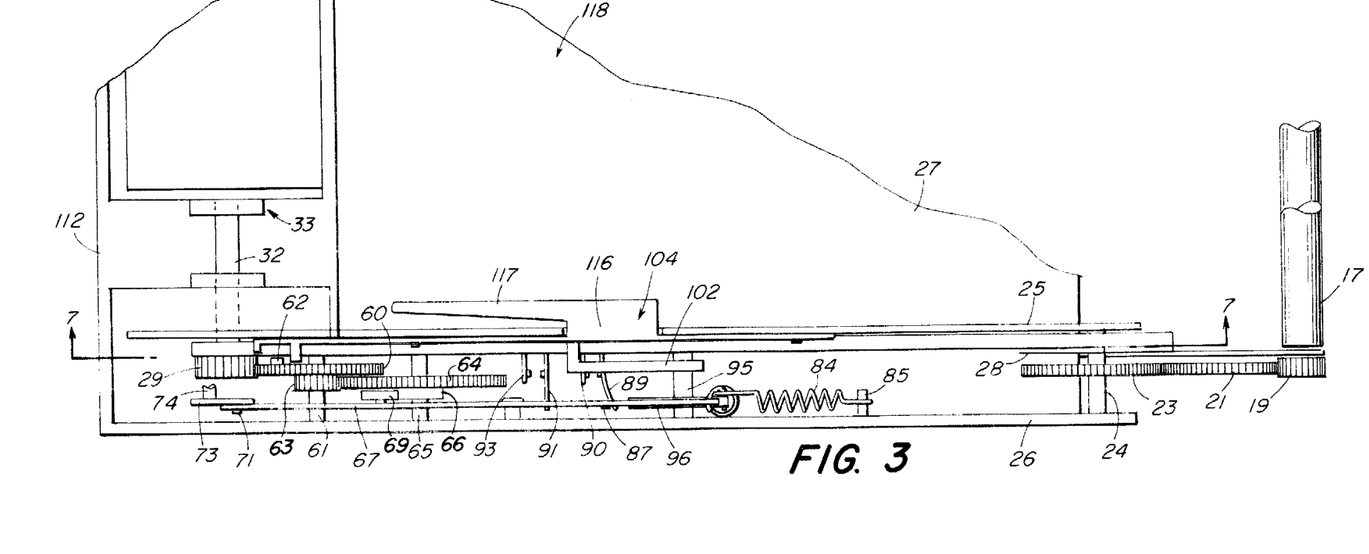
FIG. 3 is a schematic, fragmentary plan view of the apparatus of FIG. 2, taken substantially along the lines 3—3 in FIG. 2.
Figure 7:
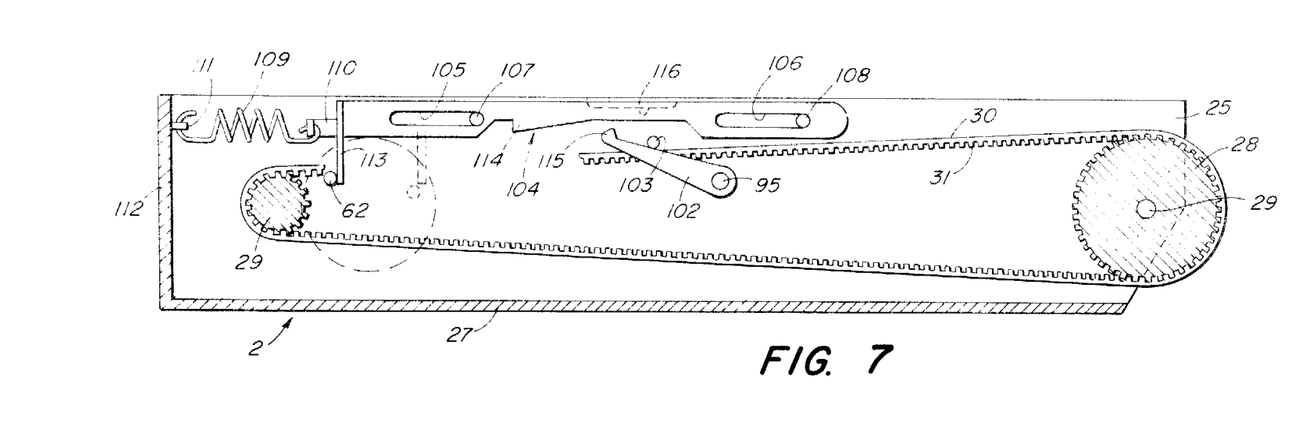
FIG. 7 is a schematic and fragmentary elevational view of a portion of the apparatus of FIG. 3, with parts shown in cross-section, parts omitted and parts broken away, taken substantially along the lines 7—7 in FIG. 3.

As shown in FIGS. 3 and 7, a sprocket 28, fixed on the shaft 24 and provided with a flange on at least the outer side as suggested in FIG. 3, is coupled to a gear 29 toward the rear of the camera by a toothed flexible elongated belt 30. The belt 30 may be of any conventional construction, and made of any suitable conventional material. At present, the preferred construction is an inner band of neoprene rubber, on which the teeth are formed, overlaid with a tensile web of glass fibers coated with nylon. The belt is of the kind commonly referred to as a timing belt, but performs no particular synchronization function in the apparatus of the invention. The teeth 31 on the belt 30 are not essential, but are preferably provided in order to improve efficiency, by reducing the shaft loads below those required to tension a toothless belt, while still delivering the desired torque to the shaft 24.

Figure 8:
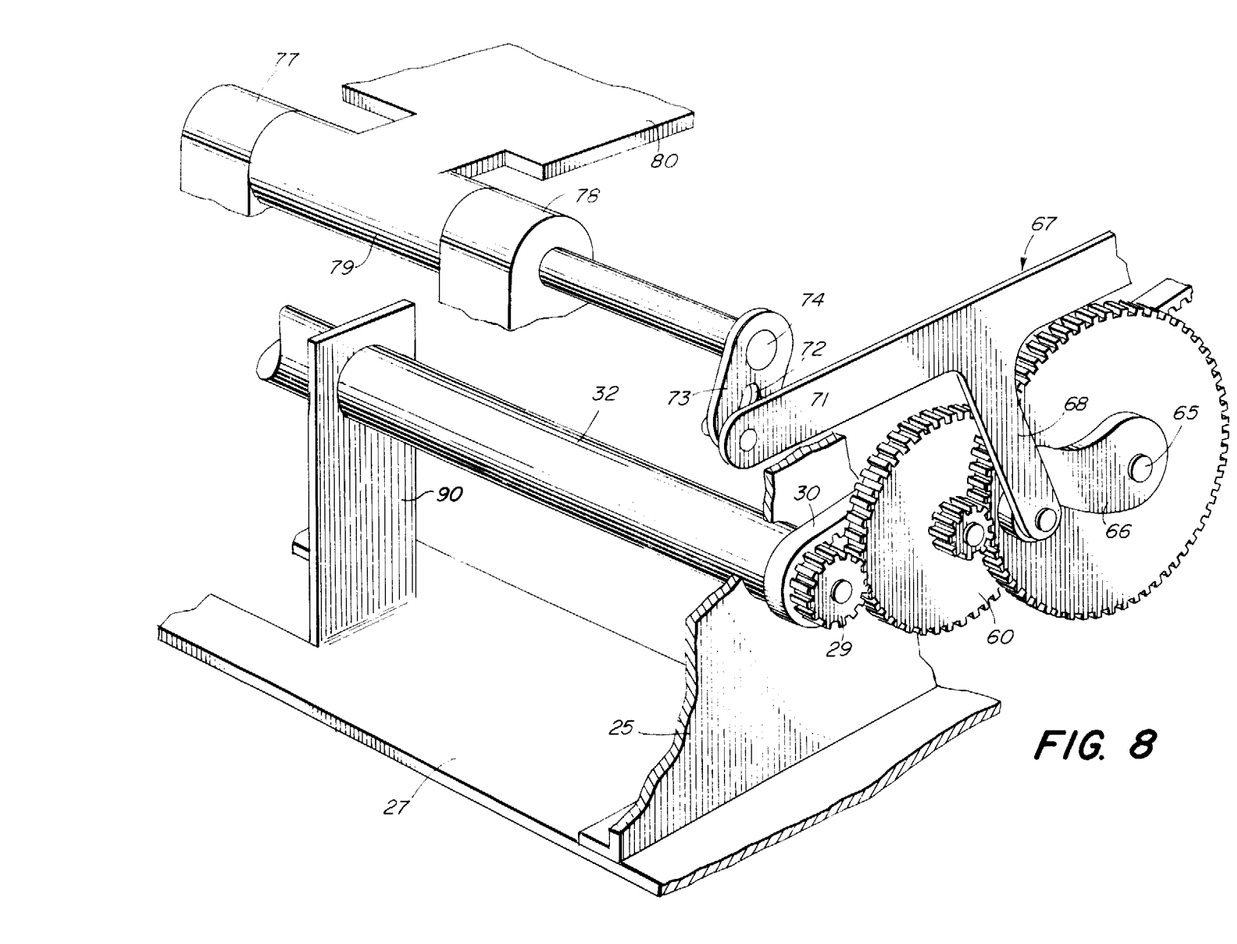
FIG. 8 is a fragmentary perspective sketch of a portion of the mirror control and timing belt drive portions of the shaft control system shown in FIGS. 1 and 6, with parts omitted and parts broken away.

Referring to FIGS. 3 and 4, the gear 29 is formed integral with the output shaft 32 of a strain wave drive shaft speed reduction unit generally designated 33. The shaft 32 is journalled in suitable apertures formed in the plate 25 and in a plate 90 formed integrally with the plate 27 as shown in FIG. 8.

With specific reference to FIG. 4, the strain wave drive unit 33 comprises a stator formed as an annular gear 34 having teeth 35. The gear 34 is preferably formed integrally with the end cap 53 of an electric motor 45, to be described.

Figure 5:
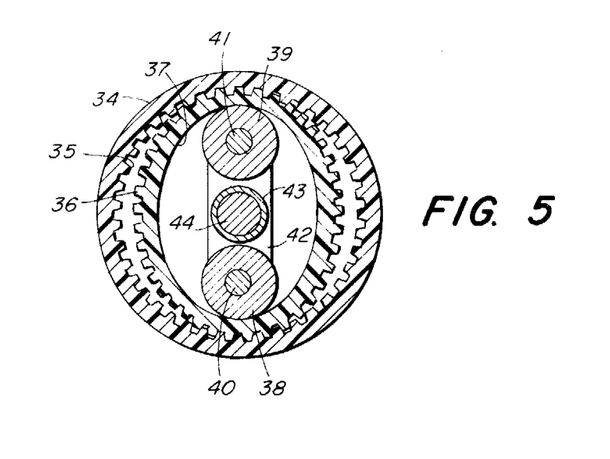
FIG. 5 is a schematic sectional view, with parts shown in cross-section and parts omitted, taken substantially along the lines 5—5 in FIG. 4 and showing the harmonic drive unit portion of the combined motor and shaft speed reduction unit shown in FIG. 4.

As shown in FIG. 5, the teeth 35 of the stator 34 mesh with teeth 36 formed on a flexible band 37. The belt 37 is formed as a bell integral with the output shaft 32. The teeth 36 on the band 37 are the same in size and shape as the teeth 35, but there are preferably two fewer of them on the belt 37 than there are on the gear 34. As shown with considerable exaggeration in FIG. 5, the result is that the band 37 is of a smaller diameter than the gear 34, and is caused to engage it at two diametrically opposed points by a strain wave generator comprising a pair of rollers 38 and 39 journalled on pins 40 and 41, respectively, carried by a rotor 42 having a hub 43 fixed to the output shaft 44 of an electric motor generally designated 45.

The motor 45 may comprise a conventional armature and field assembly enclosed in a main housing 46 having formed integrally thereon a mounting flange 47 by means of which the housing 46 is secured to the base plate 27, with an aid of any suitable fastening means, here shown as machine screws 48. The armature 49 may be of any conventional construction, provided with a commutator, not shown, at the left side of the motor as seen in FIG. 4, communicating with conventional brushes schematically indicated at 50. Drive and braking current can be supplied to these brushes at times, and for the purposes, and by the means described in the above-cited patent.

The output shaft 44 of the motor 45 is journalled in a suitable bearing 51 formed integrally with one end cap 52 of the motor 45. A second end cap 53 on the right side of the motor 45 provides a bearing 54 for the shaft 44, and has an annular flange 55 that serves to support an upper field magnet 56 and a lower field magnet 57 in the housing 46. As indicated, the gear 34 is formed on an annular flange integral with the end cap 53.

As noted above, and with reference to FIG. 5, there are two fewer teeth 36 on the belt 37 than the number n of teeth 35 on the output gear 34. By that arrangement, when the shaft 44 is rotated in one direction at a speed N1, the belt 37 will rotate relative to the stator 34 in the opposite direction and at a speed determined in a known manner as $$\frac{N1}{1-\frac{n}{2}},$$

where the sign indicates a reversal in direction, and $$1 - \frac{n}{2}$$

is the reduction ratio of the unit. For example, if the shaft 44 is rotated at 15,000 rpm, and there are 60 teeth 35 and 58 teeth 36, the reduction ratio will be minus 29, and the shaft 32 will rotate at 517.2 rpm.

Referring next to FIGS. 2 and 3, the gear 21 is made considerably larger than the gear 19, primarily to increase the distance that the rolls are carried when the bed 13 is swung down to move the rolls out of the path of a film pack when loading or unloading the camera. In practice, the gear ratio is approximately 2.51:1. The shaft 22 thus rotates at a speed below the speed of the processing rolls. It is undesirable to construct the strain wave shaft reduction unit 33 with a sufficiently low reduction ratio to bring the speed of the shaft 32 down to the speed required for the shaft 22. Accordingly, the gear 29 is made smaller than the gear 23 to effect a speed reduction ahead of the gear 21 roughly corresponding to the speed increase given to the gear 19 by the gear 21. Thus, the ratio of the gears 23 and 29 may be approximately 2.5:1, and preferably somewhat less to allow a larger turning radius on the belt 30.

The gear 29 drives the belt 30, as noted, and also drives a gear 60 journalled on a shaft 61. The shaft 61 is fixed between the side plates 25 and 26 as shown in FIG. 3. A pin 62 is carried on the gear 60, as best shown in FIG. 3. The pin 62 controls a pick mechanism in the manner to be described below in connection with FIGS. 6 and 7. The ratio of the gears 60 and 29 may be approximately 2.2:1, so that the gear 60 rotates at a speed of 235 rpm in the example given.

A pinion 63 is fixed to the gear 60 and rotates therewith on the shaft 61. The pinion 63 drives a gear 64. The gear 64 is rotatably mounted on a shaft 65. The shaft 65 is fixed between the side plates 25 and 26 as indicated in FIG. 3. A mirror recocking cam 66 is fixed to the gear 64. The ratio of the gears 64 and 63 is 4:1, and this ratio is important because it is required that the pick pin 62 be synchronized with the cam 66. The cam 66 rotates once per cycle of operation of the camera, and, with the values given in the example described, would be driven at a speed of 58.8 rpm, giving a camera operation cycle time of approximately one second.

The cam 66 controls the position of a ram generally designated 67. For this purpose, the ram 67 is provided with an arm 68 on which there is journalled a roller 69 comprising a cam follower that engages the cam 66. The ram 67 is provided with an elongated guide slot 70 which receives a pin 69 fixed to the side plate 25. The ram 67 is thus adapted to move between the position shown in FIG. 2 and a position to the left of that shown in FIG. 2.

A pin 71 fixed in one end of the ram 67 enters a slot 72 formed in a crank arm 73. As best shown in FIG. 4, the crank arm 73 is connected to a pin 74 that extends across into fixed engagement with a depending crank arm 75.

The crank arm 75 is fixed to a pin 76 that is journalled in a pair of lugs 77 and 78 fixed to the camera frame in any suitable manner, not shown.

On the pin 76 is fixed an ear 79 forming an extension of a reflex mirror assembly 80, as best shown in FIG. 1. Referring to FIG. 1, the mirror assembly 80 has a second ear 81 journalled in a pair of ears 82 and 83 fixed to the top of the main housing 2 of the camera. The mirror assembly 80 is thus adapted to swing from the position shown in FIG. 1 to a taking position up against the top panel 3. This structure, and its mode of operation, are more fully described and shown in the above-cited patent.

Referring again to FIG. 2, a spring 84 has one end secured to a pin 85 that is fixed in the side plate 25. The other end of the spring 84 is connected to a suitable aperture 86 formed in the end of the ram 67. The spring 84 thus urges the ram 67 to the position shown in FIG. 2.

A depending arm 87 formed on the ram 67 opens a normally closed switch generally designated 88 in the position of the parts shown in FIG. 2. For this purpose, as shown in FIG. 3, the arm 87 moves a resilient arm 89 away from an arm 90 to separate contacts carried by the arms 89 and 90. When the ram 67 is moved to the left of the position shown in FIGS. 2 and 3, the switch 88 is closed. As the ram moves farther to the left, the arm 87 engages a contact arm 91 formed as part of a normally open switch 92, moving it toward a contact arm 93 and bringing contacts carried by the arms 91 and 93 into contact to effect a switch closure for purposes to appear.

A shaft 95 is journalled between the side plates 25 and 26, as suggested in FIG. 3. An arm 96 is fixed on the shaft 95. A spring 97 connected between one end of the arm 96 and a bracket 98 fixed to the bottom plate 27 urges the arm 96 in a clockwise sense as seen in FIG. 2.

A pawl 100 formed on the arm 96 engages the ram 67. When the ram 67 is moved to the left as seen in FIG. 2, a cam 101 formed on the ram 67 rocks the arm 96 counterclockwise as seen in FIG. 1, before the cam 101 passes over the pawl 100 and allows the arm 96 to rock clockwise again. This action controls the position of an arm 102 fixed on the shaft 95 as shown in FIGS. 3 and 7. Comparing FIGS. 2 and 7, when the arm 96 is in the position shown in FIG. 2, the arm 102 is in the position shown in FIG. 7, in which it engages a stop pin 103 fixed to the side plate 25. As the arm 96 is rocked counterclockwise as seen in FIG. 2, the arm 102 makes a similar movement, for purposes next to be described.

Figure 6:
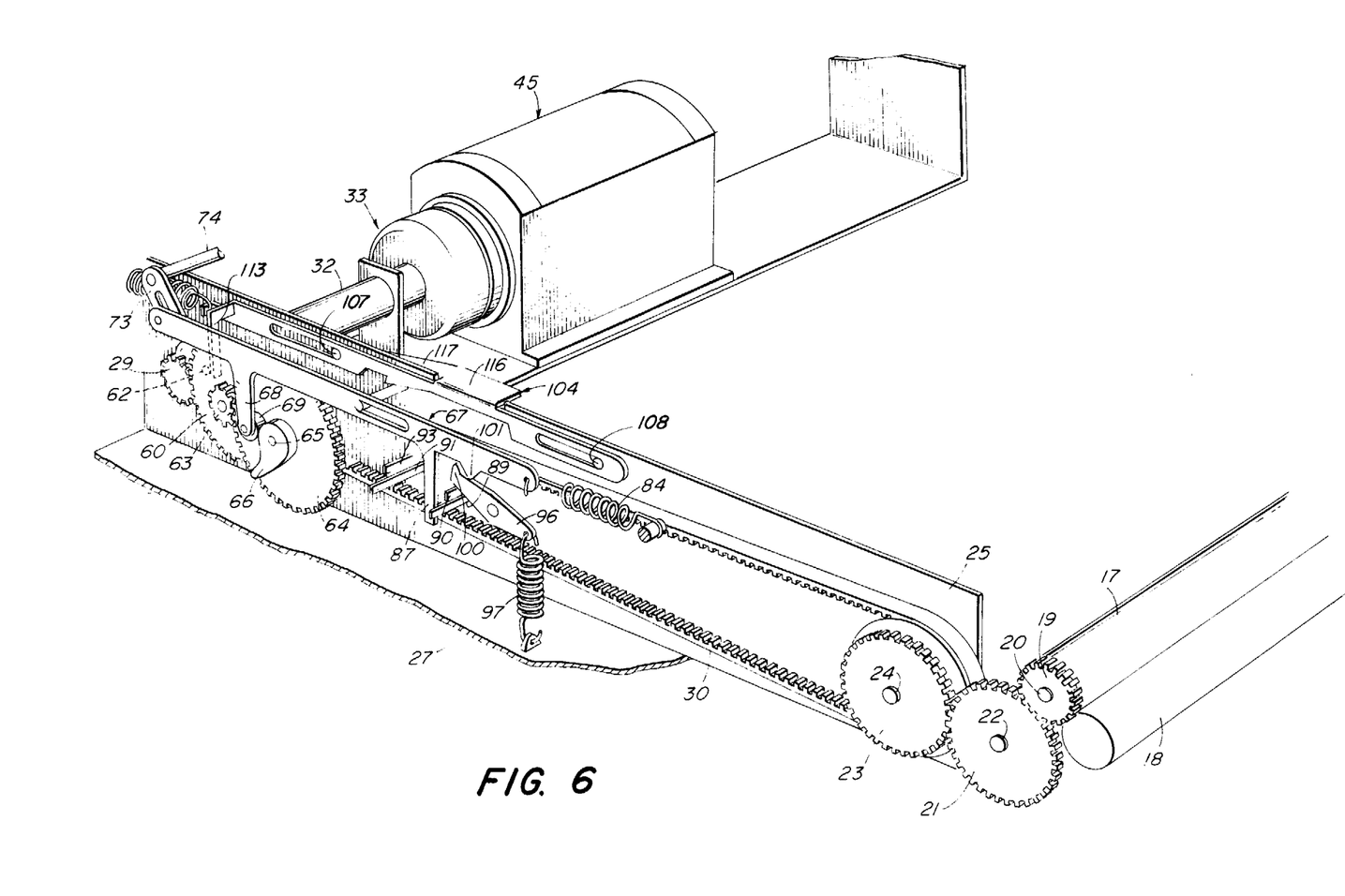
FIG. 6 is a schematic and fragmentary perspective sketch, with parts omitted and parts broken away, showing further details of the shaft control system of FIG. 1.

Referring now to FIGS. 3, 6 and 7, a pick slide generally designated 104 is formed with two elongated guide slots 105 and 106 which receive guide pins 107 and 108, respectively. The pins 107 and 108 are fixed in the side plate 25. The slide 104 is thus adapted to move, from the position shown in FIG. 7, to a position to the right of that shown in FIG. 7 in which the pins 107 and 108 engage the left ends of the slots 105 and 106.

A spring 109 connected between an end 110 of the slide 104 and a mounting tab 111 formed integral with the rear wall 112 of the housing 2 urges the slide 104 to the position shown in FIG. 7. Comparing FIGS. 2, 3 and 7, when the gear 60 is rotated counterclockwise as seen in FIG. 2, the pin 62 engages an extension 113 formed integrally with the slide 104 and drives the slide 104 to the right. As this takes place, a tooth 114 formed integrally with the slide 104 engages a pawl 115 formed on the arm 102, rocking the arm 102 counterclockwise until the tooth 114 passes over the pawl 115. The pawl 115 then rises up to catch the slide 104 and hold it in its rightmost position. Thereafter, upon further clockwise rotation of the gear 60, the pin 62 passes below the arm 113. The gear 60 makes three more revolutions during the course of one cycle of operation of the camera, but the pin 62 performs no further function during these revolutions of the gear 60.

As best shown in FIG. 3, a cross arm 116 formed integral with the slide 104 is connected to a pick arm 117 that extends down into a cassette receiving well generally designated 118 adapted to receive a cassette containing film units in the manner described in the above-cited patent. When the slide 104 is moved to the right, as best seen in FIG. 3, this pick arm 117 engages the topmost film unit in such a cassette and advances it into engagement with the processing rolls.

Having thus described the construction of the apparatus of the invention, its operation will next be described. For purposes of matters of detail which are not pertinent to this invention, and in respects in which the operation is identical, reference will be made to the above-cited U.S. Pat. No. 3,714,879, the entirety of which is hereby incorporated herein by reference.

Referring first to FIG. 1, the overall operation of the camera will be briefly reviewed, assuming that the camera is in its erect position as shown in FIG. 1 and that it is loaded with film. When the mirror assembly is down in the position shown, the camera is adapted for viewing and focusing.

When the shutter button 8 is depressed, the first operation is that the shutter of the camera, not shown, is closed. The motor 45 is then run briefly to release the mirror. In this regard, it is noted that in the standby condition of the camera, the cam 66 is essentially in the position shown in FIG. 1, wherein the cam follower 69 is on a dwell portion at the maximum radius of the cam 66.

Brief operation of the motor 45 causes the cam 66 to be rotated enough to the right to allow the cam follower to drop off the cam 66, when that occurs, the ram 67 is snapped to the right, toward the position shown in FIG. 2, by the spring 84.

The switch 92 is first opened and the switch 88 is then opened. Opening the switch 88 causes the motor 45 to stop, and begins a timing interval provided to allow the mirror assembly 80 to come to a full stop in its upper position, through circuit means described in the above-cited patent and not essential to the understanding of this invention.

The cam surface 101 formed on the ram 67 will pass over the pawl 100, depressing the pawl 100 and then releasing it without any other operation taking place. Following the timing interval begun when the switch 88 is opened, an exposure cycle is begun during which the shutter is opened and then closed. The circuits described in the above-cited patent then cause the motor 45 to be operated, whereupon the gear 64 in FIG. 2 will commence to rotate counterclockwise through an angular range in which the cam follower 40 is down on the lowest radius dwell portion of the cam 39.

Referring to FIG. 7, as this second operation of the motor begins, the pin 62 will engage the stop 113 formed on the pick slide 104 and carry the slide 104 to the right as seen in FIG. 7, advancing the topmost film unit into engagement with the rolls 17 and 18. During this operation, referring to FIGS. 1 and 2, the rolls 17 and 18 will be rotated to draw the film unit out of the cassette.

As the drive train continues to operate, the rising portion of the cam 66 will drive the ram 67 to the left in FIG. 2. The switch 88 will close, the cam 101 will rock the arm 96 counterclockwise (FIG. 2), releasing the pick slide 104 (FIG. 7) by removing the pawl 115 from the tooth 114. The slide 104 will then snap over to the position shown in FIG. 7 under the influence of the spring 107.

Referring to FIGS. 1 and 2, as the ram 67 is driven to the left, the mirror assembly 80 will be returned to the position shown in FIG. 1. As it reaches this position, the switch 92 will be closed, causing the circuit to the motor 45 to be interrupted and a braking circuit to be closed in the manner described in the above-cited patent. The parts will then come to rest in the position shown in FIG. 1, and no further operations will occur until the shutter button is again depressed.

It will be apparent that the apparatus of this invention permits the shaft speed and timing functions required in a camera such as that described in U.S. Pat. No. 3,714,879 to be carried out with the aid of considerably fewer parts. Moreover, it is possible to attain considerably greater efficiency. In particular, the strain wave drive shaft speed reduction unit 33 is capable of an efficiency given by $$\frac{600}{600 + R}$$

where R is the reduction ratio. Assuming the exemplary ratio of 29, an efficiency of 95.4 percent is attainable. It has been found that the belt 30 has an efficiency of about 95 percent. Assuming a gear efficiency of 95 percent per mesh, the rolls 17 and 18 can therefore be driven with an efficiency of $(0.95)^4 \times 100 = 81.4$ percent. There is one gear mesh between the output shaft 32 and the pick drive pin 62, and there are two meshes between the shaft 32 and the cam 66. Accordingly, these elements can be driven with efficiencies of 95 percent and 90 percent, respectively.

While the invention has been described with reference to the details of a particular embodiment thereof, many changes and variations will occur to those skilled in the art upon reading this description, and such may obviously be made without departing from the scope of the invention.

Having thus described the invention, what is claimed is:

1. A drive train for a reflex camera having a pair of processing rolls, a mirror recocking cam and a film advance pick, comprising, in combination, an electric motor, a first drive shaft, strain wave drive shaft speed reduction means connected between said motor and said first shaft to drive said shaft at a speed suitable for operating said processing rolls, means comprising an elongated toothed endless belt coupling said first shaft to said processing rolls, a pick control element, means comprising a first reduction gear coupling said first shaft to said pick control element, a mirror recocking cam, and a second reduction gear coupling said first reduction gear to said cam.

2. In combination with a reflex camera having means forming a generally rectangular compartment for receiving a film pack, an electric motor mounted in said compartment adjacent one end of said compartment, a strain wave drive shaft reduction unit connected to said motor and having an output shaft driven by said motor at a first speed, a pair of processing rolls, means mounting said processing rolls for rotation in said housing adjacent an end of said compartment opposite said first end, means comprising an endless belt coupling said output shaft of said shaft speed reduction means to said processing rolls, said belt extending along a side of said housing of said compartment in said housing, a first reduction gear mounted in said housing and driven by said output shaft, a pin affixed to said reduction gear to be driven at a speed below the speed of said first shaft, a cam, and a second reduction gear connected between said cam and said first reduction gear to drive said cam to a third speed below the speed of said pin.

3. In combination with an automatic camera having a housing and means forming a generally rectangular well in said housing for receiving a film pack, a first shaft, means mounting said first shaft in said housing adjacent the first end of said well for rotation about a first axis, an electric motor mounted in said housing adjacent said first end of said well, a strain wave drive shaft speed reducer connected between said electric motor and said first shaft, a first gear having a first diameter fixed to said first shaft for rotation therewith, a second gear having a second diameter larger than said first diameter, means rotatably mounting said second gear in said housing in operative engagement with said first gear, a pick control pin mounted on said second gear for rotation therewith, a third gear fixed to said second gear for rotation therewith, a fourth gear, means rotatably mounting said fourth gear in said housing in operative engagement with said third gear, the ratio of the diameters of said fourth to said third gears being 4:1, a mirror control cam mounted on said fourth gear for rotation therewith, a pair of processing rolls, means journalling said processing rolls in said housing adjacent a second end of said well opposite said first end for rotation about parallel axes, and means comprising a flexible toothed belt coupling said first shaft to said processing rolls to drive said rolls.

4. A shaft drive and control system for an automatic camera having a film pack receiving well and having three shaft driven devices operable in a photographic cycle at different times and at different speeds, said system comprising an electric motor mounted in one end of the camera at a first end of the well, a first shaft adapted to be coupled to the shaft driven device in the camera that operates at the highest speed, strain wave drive shaft speed reducing means coupled between said motor and said first shaft to drive said first shaft at said highest speed when said motor is energized, a second shaft adapted to be coupled to the shaft driven device in the camera that operates at the intermediate speed, a third shaft rotatably mounted in said camera on a side of said well and adapted to be coupled to the shaft driven device in the camera that operates at the lowest speed, first reduction gear means connecting said first shaft to said second shaft, and second reduction gear means connecting said second shaft to said third shaft.

5. In a reflex camera having a predetermined operating cycle, the combination comprising, a housing, means forming a generally rectangular compartment in said housing adapted to receive a supply of film units, mirror means mounted in said housing for movement between a first position and a second position, spring means biasing said mirror means toward its first position, a first shaft, means mounting said first shaft in said housing outside of said compartment for rotation about an axis parallel to and adjacent a first side of said compartment, electric motor means mounted in said housing adjacent said first side of said compartment, strain wave drive shaft speed reducing means connecting said motor means to said first shaft to rotate said first shaft through a plurality of revolutions for each operating cycle of said camera, a second shaft, means mounting said second shaft in said housing outside of said compartment for rotation about an axis parallel to and adjacent a second side of said compartment opposite said first side, processing means located in said housing and driveable to process individual film units advanced from said compartment into engagement with said processing means, means driveably connecting said second shaft to said processing means to drive said processing means when said second shaft means is rotated, shaft coupling means comprising an elongated flexible endless belt extending outside of and along a third side of said compartment and coupling said first shaft means to said second shaft means, a cam, means mounting said cam for rotation in said housing, an actuating element, means mounting said actuating element for rotation in said housing, first reduction gear means coupling said first shaft to said actuating element to rotate said actuating element four revolutions for each operating cycle of said camera, and second reduction gear means coupling said first reduction gear means to said cam to rotate said cam through one revolution for each operating cycle of said camera.

* * * * *